United States Patent
Chatman

(10) Patent No.: US 12,327,574 B2
(45) Date of Patent: Jun. 10, 2025

(54) PROVIDING OVERLAPPING TIME REDACTIONS IN MEDIA ITEMS

(71) Applicant: Everlaw, Inc., Oakland, CA (US)

(72) Inventor: Kyle Chatman, Oakland, CA (US)

(73) Assignee: Everlaw, Inc., Oakland, CA (US)

( * ) Notice: Subject to any disclaimer, the term of this patent is extended or adjusted under 35 U.S.C. 154(b) by 242 days.

(21) Appl. No.: 18/061,037

(22) Filed: Dec. 2, 2022

(65) Prior Publication Data

US 2024/0185889 A1  Jun. 6, 2024

(51) Int. Cl.
*G11B 27/031* (2006.01)

(52) U.S. Cl.
CPC .................. *G11B 27/031* (2013.01)

(58) Field of Classification Search
None
See application file for complete search history.

(56) References Cited

U.S. PATENT DOCUMENTS

| | | | |
|---|---|---|---|
| 10,347,293 B1 | 7/2019 | Skinner et al. | |
| 2009/0092374 A1* | 4/2009 | Kulas | H04N 21/6125 386/282 |
| 2009/0094520 A1* | 4/2009 | Kulas | G06F 16/7867 707/999.102 |
| 2010/0169786 A1* | 7/2010 | O'Brien | G06F 16/745 715/744 |
| 2010/0174783 A1* | 7/2010 | Zarom | H04L 65/403 709/205 |
| 2010/0235379 A1 | 9/2010 | Reichbach | |
| 2012/0110455 A1* | 5/2012 | Sharma | A63F 13/847 715/719 |
| 2017/0048275 A1 | 2/2017 | John et al. | |

OTHER PUBLICATIONS

Feb. 14, 2024—(WO) International Search Report and Written Opinion—App PCT/US2023/080115.

* cited by examiner

*Primary Examiner* — Gelek W Topgyal
(74) *Attorney, Agent, or Firm* — Banner & Witcoff, Ltd.

(57) ABSTRACT

Providing overlapping time range redactions in media items like digital videos is disclosed without loss of information about the individual redactions therein. For example, a platform receives a set of redactions associated with a media item where at least some of the redactions overlap. A process is performed to determine a set of non-overlapping time ranges based on the set of redactions, where the redaction information is associated with individual non-overlapping time ranges. The correct redaction information from the corresponding overlapping time ranges will be applied to the non-overlapping time range redaction. This single non-overlapping redaction is stored as a single unit and has the advantage of requiring less storage space and processing power than multiple overlapping redactions, while retaining, in one implementation, all of the corresponding redaction information (e.g., labels) of the original correspondence overlapping redactions.

20 Claims, 8 Drawing Sheets

PROVIDING OVERLAPPING TIME REDACTIONS IN MEDIA ITEMS

FIELD OF THE DISCLOSURE

The present disclosure relates to methods, computing platforms, and storage media for providing overlapping time range redactions in media items.

BACKGROUND

In the context of legal proceedings, for example, document review (or "doc" review) describes a process by which a party to a case analyzes documents and/or other media (e.g., video or audio) in their possession (e.g., possessed before the case or obtained through discovery) to determine which documents are relevant to the case. Attorneys often perform document review for their clients. Many times, certain parts of documents and/or other media need to be redacted before being viewed by another party to the case. Redactions are often performed on parts that are confidential, privileged, or otherwise sensitive.

During review of media items, such as video, audio and/or text files, a reviewer may wish to redact different spans of the media items for different reasons (or multiple reasons). Some conventional systems do not allow redactions to overlap, meaning that a given span cannot be associated with multiple different reasons for redaction. Reasons include marking various sections confidential, privileged, sensitive, etc. Some systems merge overlapping redactions into one; however, if a user wants to edit the redactions individually, the redaction stamps will no longer be associated with the correct time ranges. Some systems apply each redaction to a media item individually; however, it is inefficient to redact the same time span multiple times, redaction stamps are overwritten by subsequent passes, doing time-based searches on the redactions are inefficient because one cannot apply a binary search, and a redaction job cannot be easily divided into smaller parts assigned to different reviewers for a divide-and-conquer approach.

Conventional systems typically do not provide for redacting different spans of a media item for different reasons if such spans are overlapping. To obtain such redactions, conventional systems often require the media item to be processed separately for each different reason for redacting, thus multiplying the processing requirements and storage needs.

SUMMARY

One aspect of the present disclosure relates to a method for providing overlapping time range redactions in media items. The method includes receiving a media item. The media item includes one or both of video or audio. The method includes receiving a set of redactions associated with the media item including a first redaction and a second redaction. The first redaction corresponds to a first time range within the media item and the second redaction corresponds to a second time range within the media item. The first time range overlaps with the second time range. The method includes determining a set of non-overlapping time ranges based on the set of redactions. The method includes associating redaction information with individual non-overlapping time ranges. The redaction information relates to two or more redactions in the set of redactions.

Another aspect of the present disclosure relates to a computing platform configured for providing overlapping time range redactions in media items. The computing platform includes a non-transient computer-readable storage medium having executable instructions embodied thereon. The computing platform includes one or more hardware processors configured to execute the instructions. The processor(s) execute the instructions to receive a media item. The media item includes one or both of video or audio. The processor(s) execute the instructions to receive a set of redactions associated with the media item including a first redaction and a second redaction. The first redaction corresponds to a first time range within the media item and the second redaction corresponds to a second time range within the media item. The first time range overlaps with the second time range. The processor(s) execute the instructions to receive start and end times for each redaction in the set of redactions. The processor(s) execute the instructions to chronologically sort the start and end times into a list. The processor(s) execute the instructions to, for each region between two adjacent start or end times, determine any associated redactions of the set of redactions. The processor(s) execute the instructions to determine a set of non-overlapping time ranges based on the set of redactions. The processor(s) execute the instructions to associate redaction information with individual non-overlapping time ranges. The redaction information relates to two or more redactions in the set of redactions.

Yet another aspect of the present disclosure relates to a method for providing overlapping time range redactions in media items. The method includes receiving a media item. The media item includes one or both of video or audio. The method includes receiving a set of redactions associated with the media item including a first redaction and a second redaction. The first redaction corresponds to a first time range within the media item and the second redaction corresponds to a second time range within the media item. The first time range overlaps with the second time range. The method includes assigning an initial region to a duration of media item, the initial region being unassociated with any redactions. The method includes, for each redaction in the set of redactions, determining whether a given redaction starts after an end of a preceding redaction. The method includes, in response to the given redaction starting after the end of the preceding redaction, introducing two new regions to the duration of the media item including a first region adjacent to a second region, wherein the first region represents the given redaction, wherein the second region represents a remaining duration of the media item, and wherein the second region is unassociated with any redactions. The method includes, in response to the given redaction starting before the end of a preceding redaction, splitting a region containing a start time of the given redaction into two new regions at the start time of the given redaction. The method includes, in response to the given redaction ending before the end of a preceding redaction, splitting a region contain an end time of the given redaction into another two new regions at the end time of the given redaction, wherein the given redaction is associated with each region between the start time and end time of the given redaction. The method includes determining a set of non-overlapping time ranges based on the set of redactions. The method includes associating redaction information with individual non-overlapping time ranges. The redaction information relates to two or more redactions in the set of redactions.

DETAILED DESCRIPTION

Implementations described herein provide media item redaction capabilities that accommodate overlapping time range redactions in media items (e.g., digital videos) without loss of information about the individual redactions therein. For example, some implementations receive a set of redactions associated with a media item where at least some of the redactions overlap. The system performs a process (e.g., a split-regions process or a time-search process) to determine a set of non-overlapping time ranges based on the set of redactions, where the redaction information is associated with individual non-overlapping time ranges. The system applies the correct redaction information from the corresponding overlapping time ranges to the non-overlapping time range redaction. This single non-overlapping redaction is stored as a single unit and has the advantage of requiring less storage space and processing power than multiple overlapping redactions, while retaining, in one implementation, all of the corresponding redaction information (e.g., labels) of the original corresponding overlapping redactions. Some implementations associate a text stamp with each non-overlapping time range and display that stamp when the media item is played.

The disclosed system(s) and method(s) save significant computing resources, such as processing power and memory usage by cutting down the need to process a media item multiple times when there are multiple reasons for redacting spans that overlap. As such, the disclosed subject technology provides improvements to the functioning of the computer itself because it improves processing and efficiency in media redaction.

Figure 1A:
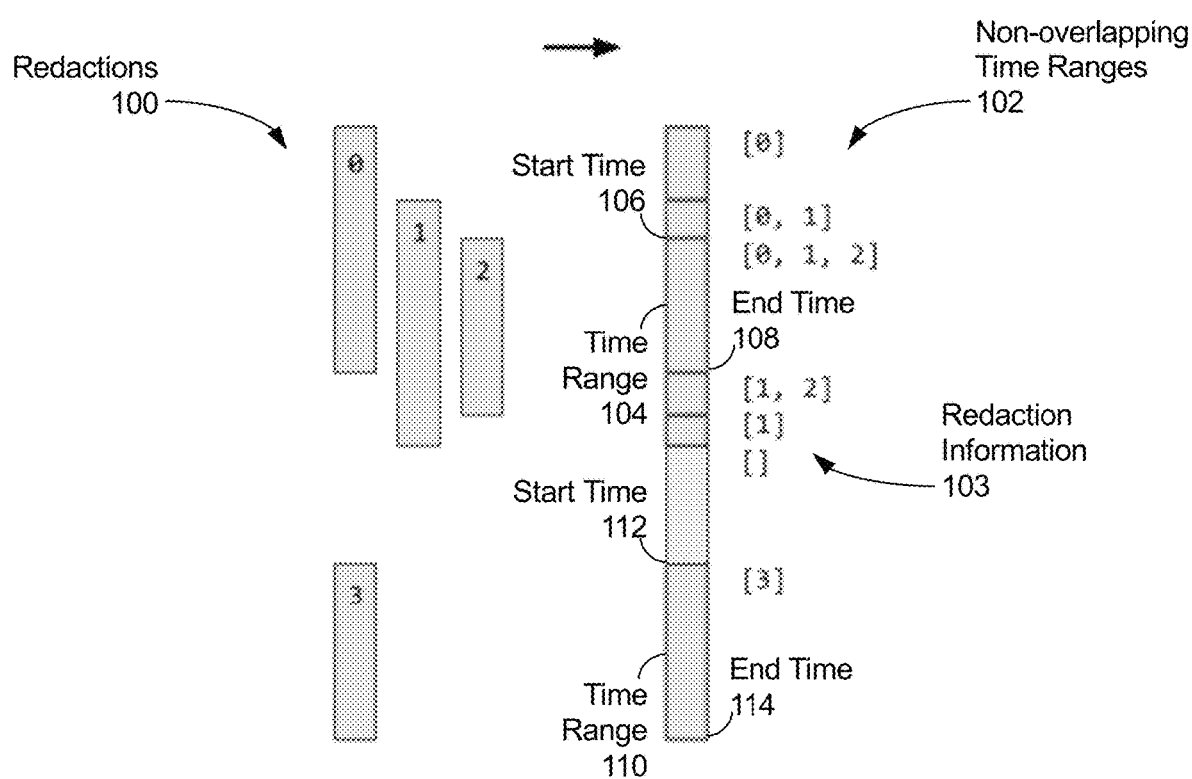
FIG. 1A illustrates overlapping redactions being applied to a single media item, in accordance with one or more implementations.

FIG. 1 illustrates overlapping redactions 100 being applied to a single media item, in accordance with one or more implementations. Some implementations start with an initial media item, segment it into various spans (e.g., time ranges in a video), generate redaction information with different spans, and create a final version of the media item with spans and associated redaction information. The redactions 100 include one or more redactions, shown in FIG. 1 as redactions 0, 1, 2, and 3. The redactions 100 are processed to obtain non-overlapping time ranges 102. Individual non-overlapping time ranges 102 are associated with one or more redactions 100, as indicated by redaction information 103.

The redaction information 103 conveys which redactions correspond to a given time range and their associated information. For example, time range 104 is defined as a duration of the media item between a start time 106 and an end time 108. Being indicated by the redaction information 103 as corresponding to "[0, 1, 2]," the time range 104 is associated with redactions 0, 1, and 2. As another example, time range 110 is defined as a duration of the media item between a start time 112 and an end time 114. Being indicated by the redaction information 103 as corresponding to "[3]," the time range 110 is associated with redaction 3. Different approaches can be performed to determine the various start/end times defining the non-overlapping time ranges and generate redaction information with each individual non-overlapping time range.

Figure 1B:
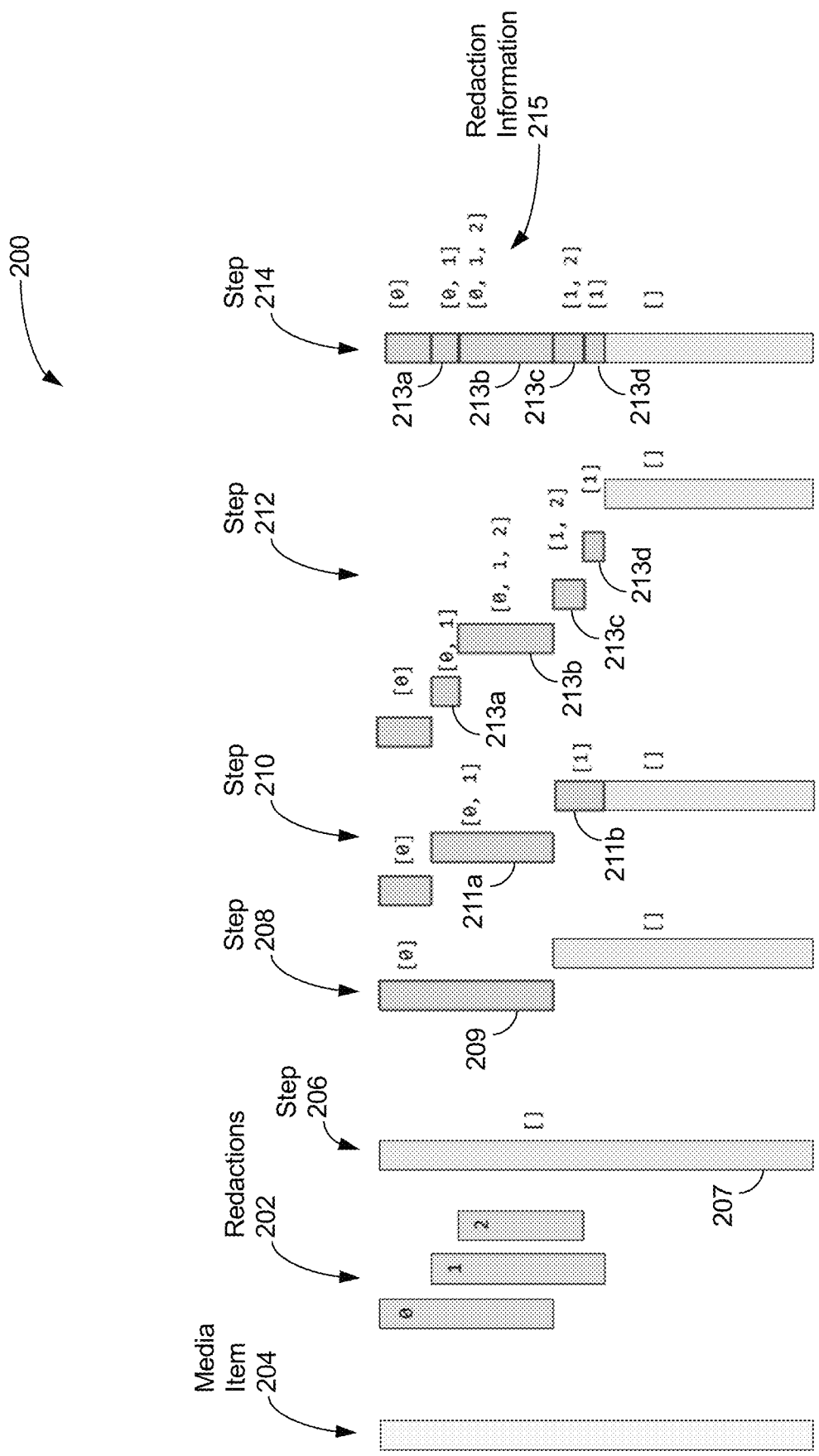
FIG. 1B illustrates split regions with overlapping redactions in a single media item, in accordance with one or more implementations.

FIG. 1B illustrates split regions 200 with overlapping redactions 202 in a single media item 204, in accordance with one or more implementations. The redactions 202 include one or more redactions, shown in FIG. 1B as redactions 0, 1, and 2. At step 206, an initial region 207 is assigned to a duration of media item 204. The initial region 207 is unassociated with any redactions, as denoted by "[ ]."

At step 208, a first redaction (i.e., corresponding to redaction 0 of redactions 202) is added to the media item 204 by adding a new region 209 associated with redaction 0, as detonated by "[0]."

At step 210, a second redaction (i.e., corresponding to redaction 1 of redactions 202) is added to the media item 204. For each redaction in the set of redactions 202, it is determined whether a given redaction (e.g., redaction 1) starts before an end of a preceding redaction (e.g., redaction 0). In response to the given redaction starting before the end of the preceding redaction, two new regions 211a and 211b are introduced to the duration of the media item. These regions together run the length of the second redaction (i.e., redaction 1 of redactions 202) being added, and region 211a starts at the beginning of redaction 1 and ends at the end of redaction 0, representing the portion where redaction 1 and redaction 0 overlap. Region 211b starts from the end of redaction 0 and goes to the end of redaction 1, representing the rest of the part of redaction 1 that does not overlap with redaction 0. Consequently, region 211a is associated with redactions 0 and 1, as denoted by "[0, 1]," and a region 211b is associated with redaction 1, as denoted by "[1]."

At step 212, a third redaction (i.e., corresponding to redaction 2 of redactions 202) is added to the media item 204. In response to the given redaction starting before the end of a preceding redaction, a region containing a start time of the given redaction is split into two new regions at the start time of the given redaction. For example, a region 213a is associated with redactions 0 and 1 as denoted by "[0, 1]," and a region 213b is associated with redactions 0, 1, and 2, as denoted by "[0, 1, 2]." In addition, a region containing an end time of the given redaction is split into another two new regions at the end time of the given redaction. These regions together run the length of the third redaction (i.e., redaction 2 of redactions 202) being added, and region 213a starts at the beginning of redaction 1 and ends at the beginning of redaction 2, representing the portion where redaction 0 and redaction 1 overlap. Region 213b starts at the beginning of redaction 2 and from the end of redaction 0, representing the portion where redaction 0, redaction 1, and redaction 2 overlap. Region 213c starts at the end of redaction 0 and ends at the end of redaction 2, representing the portion where redaction 1 and redaction 2 overlap. Region 213d starts at the end of redaction 2 and ends at the end of redaction 1, representing the portion where redaction 1 exists by itself. Consequently, region 213c is associated with redactions 1 and 2 as denoted by "[1, 2]," and a region 213d associated with redaction 1, as denoted by "[1]." A given redaction is associated with each region between the start time and end time of the given redaction.

At step 214, non-overlapping time frames are assembled corresponding to the regions (e.g., regions 213a, 213b, 213c, and 213d) added in the preceding steps. Each span of the media item 204 is associated with zero or more redactions, depending on how different redactions overlap. Since redactions of differing types (e.g., confidential versus privileged) that overlap can be stored in a single version of the media item 204, space in memory is saved and processing requirements are reduced.

Figure 1C:
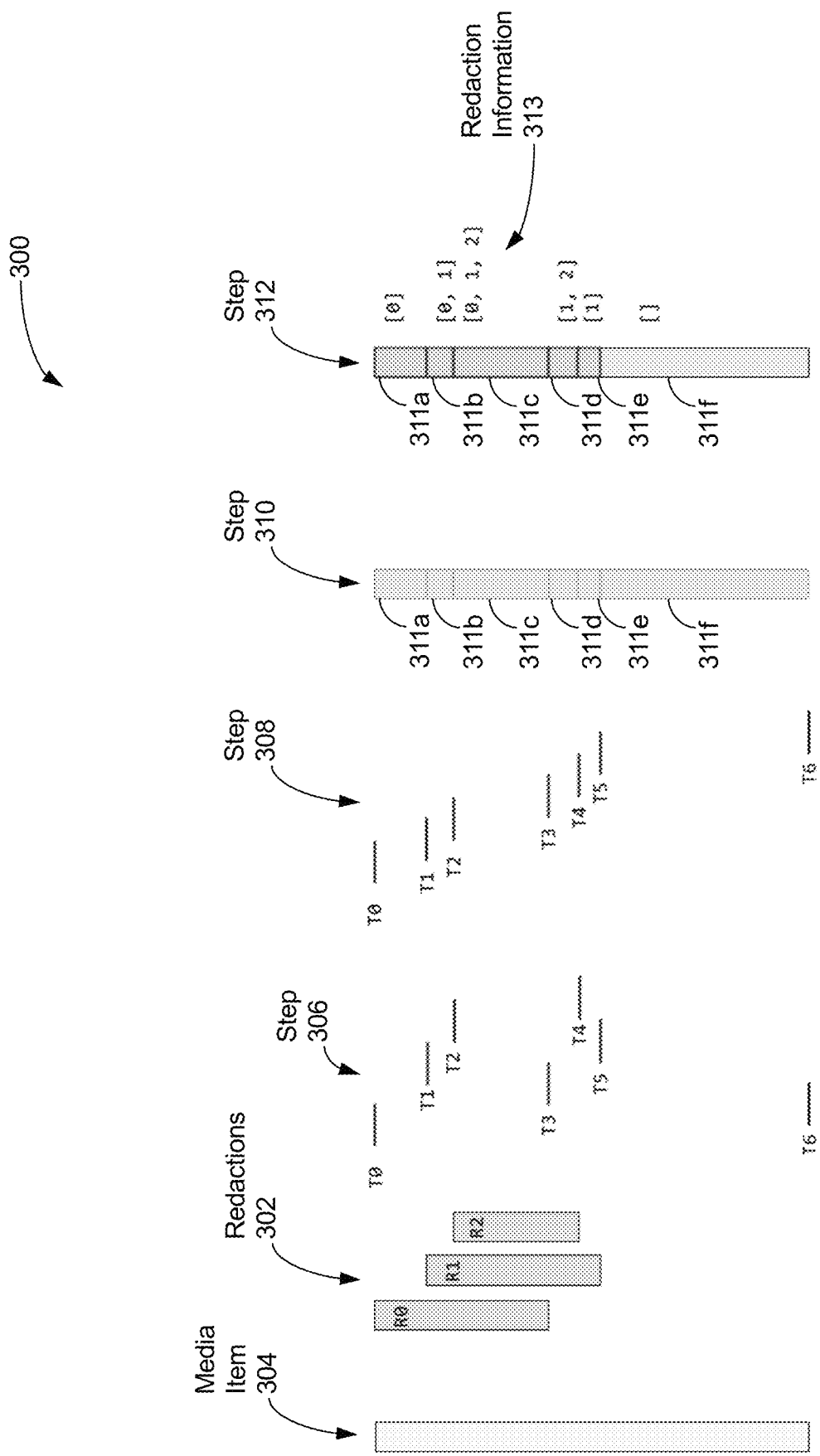
FIG. 1C illustrates time search with overlapping redactions in a single media item, in accordance with one or more implementations.

FIG. 1C illustrates a time search process 300 with overlapping redactions 302 in a single media item 304, in accordance with one or more implementations. The redactions 302 include one or more redactions, shown in FIG. 1C as redactions R0, R1, and R2. At step 306, start and end times are obtained for each redaction in the set of redactions 302. More specifically, time T0 is determined as the start time of the media item 304 while time T6 is determined as the end time of the media item 304. For redaction R0, the start and end times are determined, respectively, as time T0 and time T3. Times T1 and T5 are determined, respectively, as the start and end times of redaction R1. The redaction R2 has a start time determined at time T2 and an end time determined at T4.

At step 308, the start and end times are sorted (e.g., chronologically) into a list. Since the media item 304 is processed first, redaction R0 second, redaction R1, and finally redaction R2 fourth, the start and end times are determined out of order (e.g., T0, T6, T3, T1, T5, T2, T4). Duplicate times are omitted from the list (e.g., when a given end time of one redaction coincides with a given start time of another redaction). Sorting the start and end times includes reordering based on when they occur in the media item 304 (e.g., T0, T1, T2, T3, T4, T5, T6) rather than the order in which they were determined.

At step 310, the start and end time are mapped to non-overlapping time frames of the media item 304. For example, time frame 311a maps to a duration between times T0 and T1, time frame 311b maps to a duration between times T1 and T2, time frame 311c maps to a duration between times T2 and T3, time frame 311d maps to a duration between times T3 and T4, time frame 311e maps to a duration between times T4 and T5, and time frame 311e maps to a duration between times T5 and T6.

At step 312, for each region or time frame between two adjacent start or end times, any associated redactions of the set of redactions 302 are determined, as illustrated by redaction information 313. For example, time frame 311a is associated with redaction R0 (e.g., as indicated by "[0]" in the redaction information 313); time frame 311b is associated with redactions R0 and R1 (e.g., as indicated by "[0, 1]" in the redaction information 313); time frame 311c is associated with redactions R0, R1, and R2 (e.g., as indicated by "[0, 1, 2]" in the redaction information 313); time frame 311d is associated with redactions R1 and R2 (e.g., as indicated by "[1, 2]" in the redaction information 313); time frame 311e is associated with redaction R1 (e.g., as indicated by "[1]" in the redaction information 313); and time frame 311e is not associated with any redactions (e.g., as indicated by "[ ]" in the redaction information 313).

Figure 2:
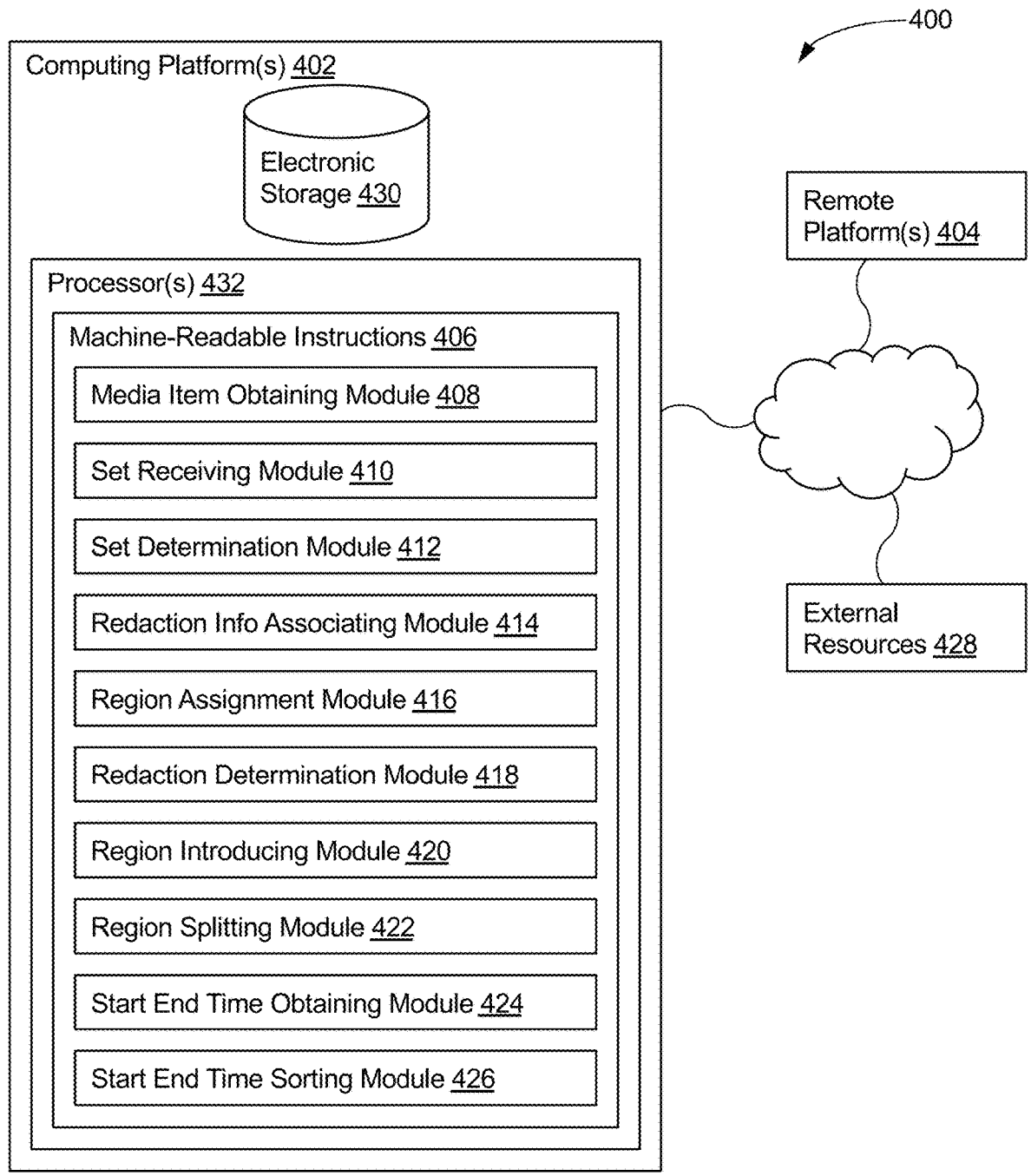
FIG. 2 illustrates a system configured for providing overlapping time range redactions in media items, in accordance with one or more implementations.

FIG. 2 illustrates a system 400 configured for providing overlapping time range redactions in media items, in accordance with one or more implementations. In some implementations, system 400 includes one or more computing platforms 402. Computing platform(s) 402 are configured to communicate with one or more remote platforms 404 according to a client/server architecture, a peer-to-peer architecture, and/or other architectures. Remote platform(s) 404 are configured to communicate with other remote platforms via computing platform(s) 402 and/or according to a client/server architecture, a peer-to-peer architecture, and/or other architectures. Users access system 400 via remote platform(s) 404.

Computing platform(s) 402 are configured by machine-readable instructions 406. Machine-readable instructions 406 include one or more instruction modules. The instruction modules include computer program modules. The instruction modules include one or more of media item obtaining module 408, set receiving module 410, set determination module 412, redaction information associating module 414, region assignment module 416, redaction determination module 418, region introducing module 420, region splitting module 422, start end time obtaining module 424, start end time sorting module 426, and/or other instruction modules.

Media item obtaining module 408 be configured to obtain a media item. The media item includes an electronic media file playable by an electronic media player. The media item includes one or both of video or audio. In some implementations, the media item includes texts (e.g., a text transcript of a deposition with timestamps). Set receiving module 410 is configured to receive a set of redactions associated with the media item including a first redaction and a second redaction. A given redaction of the set of redactions includes a span of the media item that is to be visually obscured and/or muted before being presented to a particular party. For example, a given redaction of the set of redactions is associated with one or more of audio only, video only, or audio and video of the given media item. The first redaction is associated with a first purpose (e.g., confidential information) for redacting and the second redaction is associated with a second purpose (e.g., privileged information) for redacting. The first redaction corresponds to a first time range within the media item and the second redaction corresponds to a second time range within the media item. The first time range overlaps with the second time range. The first time range overlapping with the second time frame includes at least a portion of the first time range coinciding with at least a portion of the second time range.

Set determination module 412 is configured to determine a set of non-overlapping time ranges based on the set of redactions. A given non-overlapping time range of the set of non-overlapping time frames fails to coincide with any other non-overlapping time ranges. The set of non-overlapping time ranges account for all redactions across a duration of the media item. The duration of the media item includes an entire duration of the media item.

Redaction information associating module 414 is configured to generate redaction information with individual non-overlapping time ranges. In some implementations, individual non-overlapping time ranges are associated with one or more of a start time or an end time. For example, the redaction information for a given non-overlapping time range is associated with one or more of a redaction identifier, a timestamp within the media item, confidentiality, a privilege, a sensitivity, an access level, and/or other redaction information. A given redaction identifier may include an alphanumeric code or tag associated with a given redaction. The redaction information relates to one or more redactions in the set of redactions.

Region assignment module 416 is configured to assign an initial region to a duration of media item. The duration of the media item includes an entire duration of the media item. The initial region is unassociated with any redactions. A given duration includes any span of the media item having a span start time and/or span end time that falls between the media item start time and the media item end time. An entire duration includes a span of the media item that shares a start time and an end time with the media item.

Redaction determination module 418 is configured to, for each redaction in the set of redactions, determine whether a given redaction starts after an end of a preceding redaction. The preceding redaction immediately precedes the given redaction. A start time of the preceding redaction immediately precedes a start time of the given redaction with any interstitial start times being absent. In one implementation, the redaction determination module 418 determines whether a redaction starts after the end of any or all preceding redactions, whereas the given redaction may overlap with a redaction besides the one that immediately preceded it.

Redaction determination module 418 is configured to, for each region between two adjacent start or end times, determine any associated redactions of the set of redactions. The two adjacent start or end times occur sequentially in the list with any interstitial start or end times being absent.

Region introducing module 420 is configured to, in response to the given redaction starting after the end of, in one implementation, all preceding redactions, introduce two new regions to the duration of the media item including a first region adjacent in time to a second region. The first region represents the given redaction. The second region represents a remaining duration of the media item. The remaining duration of the media item spans from an end time of the given redaction to an end of the media item. The second region is unassociated with any redactions.

Region splitting module 422 is configured to, in response to the given redaction starting before the end of a preceding redaction, split a region containing a start time of the given redaction into two new regions. The split occurs at the start time of the given redaction.

Region splitting module 422 is configured to, in response to the given redaction ending before the end of a preceding redaction, splitting a region containing an end time of the given redaction into another two new regions. The split occurs at the end time of the given redaction. The given redaction is associated with any region between the start time and end time of the given redaction. In one implementation, this is performed in response to the redaction ending before the end of all preceding redactions, whereas the given redaction may overlap with a redaction besides the one that immediately preceded it.

Start end time obtaining module 424 is configured to obtain start and end times for each redaction in the set of redactions.

Start end time sorting module 426 is configured to chronologically sort the start and end times into a list. Chronologically sorting the start and end times includes ordering the start and end times from earliest when playing the media item to latest when playing the media item. A given start or end time that coincides with another start time or end time is omitted from the list.

In some implementations, computing platform(s) 402, remote platform(s) 404, and/or external resources 428 are operatively linked via one or more electronic communication links. For example, such electronic communication links is established, at least in part, via a network such as the Internet and/or other networks. It will be appreciated that this is not intended to be limiting, and that the scope of this disclosure includes implementations in which computing platform(s) 402, remote platform(s) 404, and/or external resources 428 is operatively linked via some other communication media.

A given remote platform 404 includes one or more processors configured to execute computer program modules. The computer program modules are configured to enable an expert or user associated with the given remote platform 404 to interface with system 400 and/or external resources 428, and/or provide other functionality attributed herein to remote platform(s) 404. For example, a given remote platform 404 and/or a given computing platform 402 includes one or more of a server, a desktop computer, a laptop computer, a handheld computer, a tablet computing platform, a Smartphone, a gaming console, and/or other computing platforms.

External resources 428 include sources of information outside of system 400, external entities participating with system 400, and/or other resources. In some implementations, some or all of the functionality attributed herein to external resources 428 are provided by resources included in system 400.

Computing platform(s) 402 includes electronic storage 430, one or more processors 432, and/or other components. Computing platform(s) 402 include communication lines, or ports to enable the exchange of information with a network and/or other computing platforms. Illustration of computing platform(s) 402 in FIG. 2 is not intended to be limiting. Computing platform(s) 402 include a plurality of hardware, software, and/or firmware components operating together to provide the functionality attributed herein to computing platform(s) 402. For example, computing platform(s) 402 are implemented by a cloud of computing platforms operating together as computing platform(s) 402, in some implementations.

Electronic storage 430 includes non-transitory storage media that electronically stores information. Electronic storage 430 includes computer memory. The electronic storage media of electronic storage 430 includes one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 430 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 430 includes one or more virtual storage resources (e.g., cloud storage, a virtual private network, and/or other virtual storage resources). Electronic storage 430 stores software algorithms, information determined by processor(s) 432, information received from computing platform(s) 402, information received from remote platform(s) 404, and/or other information that enables computing platform(s) 402 to function as described herein.

Processor(s) 432 are configured to provide information processing capabilities in computing platform(s) 402. As such, processor(s) 432 include one or more of a digital processor, an analog processor, a digital circuit designed to process information, an analog circuit designed to process information, a state machine, and/or other mechanisms for electronically processing information. Although processor(s) 432 is shown in FIG. 2 as a single entity, this is for illustrative purposes only. In some implementations, processor(s) 432 include a plurality of processing units. These processing units could be physically located within the same device, or processor(s) 432 could represent processing functionality of a plurality of devices operating in coordination. Processor(s) 432 are configured to execute modules 408, 410, 412, 414, 416, 418, 420, 422, 424, and/or 426, and/or other modules. Processor(s) 432 are configured to execute modules 408, 410, 412, 414, 416, 418, 420, 422, 424, and/or 426, and/or other modules by software; hardware; firmware; some combination of software, hardware, and/or firmware; and/or other mechanisms for configuring processing capabilities on processor(s) 432. As used herein, the term "module" refers to any component or set of components that perform the functionality attributed to the module. This includes one or more physical processors during execution of processor readable instructions, the processor readable instructions, circuitry, hardware, storage media, or any other components.

It should be appreciated that although modules 408, 410, 412, 414, 416, 418, 420, 422, 424, and/or 426 are illustrated in FIG. 2 as being implemented within a single processing unit, in implementations in which processor(s) 432 includes multiple processing units, one or more of modules 408, 410, 412, 414, 416, 418, 420, 422, 424, and/or 426 are implemented remotely from the other modules. The description of the functionality provided by the different modules 408, 410, 412, 414, 416, 418, 420, 422, 424, and/or 426 described below is for illustrative purposes, and is not intended to be limiting, as any of modules 408, 410, 412, 414, 416, 418, 420, 422, 424, and/or 426 provide more or less functionality than is described. For example, one or more of modules 408, 410, 412, 414, 416, 418, 420, 422, 424, and/or 426 could be eliminated, and some or all of its functionality would be provided by other ones of modules 408, 410, 412, 414, 416, 418, 420, 422, 424, and/or 426. As another example, processor(s) 432 are configured to execute one or more additional modules that perform some or all of the functionality attributed below to one of modules 408, 410, 412, 414, 416, 418, 420, 422, 424, and/or 426.

Figure 3:
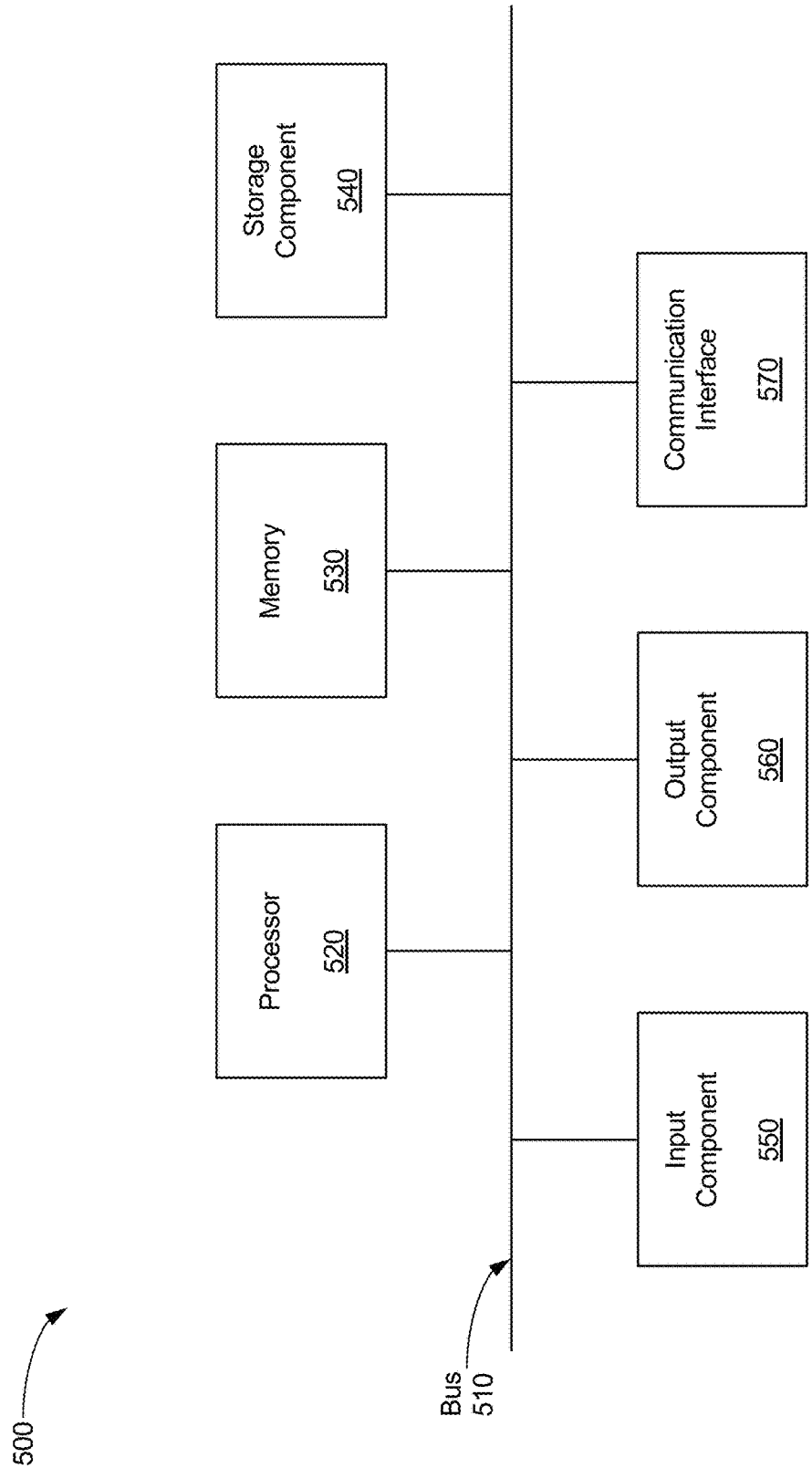
FIG. 3 illustrates an example computer system to implement the processes.

FIG. 3 is a diagram of example components of a device 500, which corresponds to one or more of computing platform(s) 402, remote platform(s) 404, and/or other device(s) described herein. In some implementations, computing platform(s) 402, remote platform(s) 404, and/or other devices described herein include one or more devices 500 and/or one or more components of device 500. As shown in FIG. 3, device 500 includes a bus 510, a processor 520, a memory 530, an input component 540, an output component 550, and a communication component 560.

Bus 510 includes one or more components that enable wired and/or wireless communication among the components of device 500. Bus 510 couples together two or more components of FIG. 3, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 includes random access memory (RAM), read only memory (ROM), a hard disk drive, and/or another type of memory (e.g., a flash memory, a magnetic memory, and/or an optical memory). Memory 530 includes internal memory (e.g., RAM, ROM, or a hard disk drive) and/or removable memory (e.g., removable via a universal serial bus connection). Memory 530 is a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 includes a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 includes a receiver, a transmitter, a transceiver, a modem, a network interface card, and/or an antenna.

Device 500 performs one or more operations or processes described herein. For example, a non-transitory computer-readable medium (e.g., memory 530) stores a set of instructions (e.g., one or more instructions or code) for execution by processor 520. Processor 520 executes the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 could be configured to perform one or more operations or processes described herein. Thus, implementations described herein are not limited to any specific combination of hardware circuitry and software.

The number and arrangement of components shown in FIG. 3 are provided as an example. Device 500 could include additional components, fewer components, different components, or differently arranged components than those shown in FIG. 3. Additionally, or alternatively, a set of components (e.g., one or more components) of device 500 perform one or more functions described as being performed by another set of components of device 500.

Figure 4A:
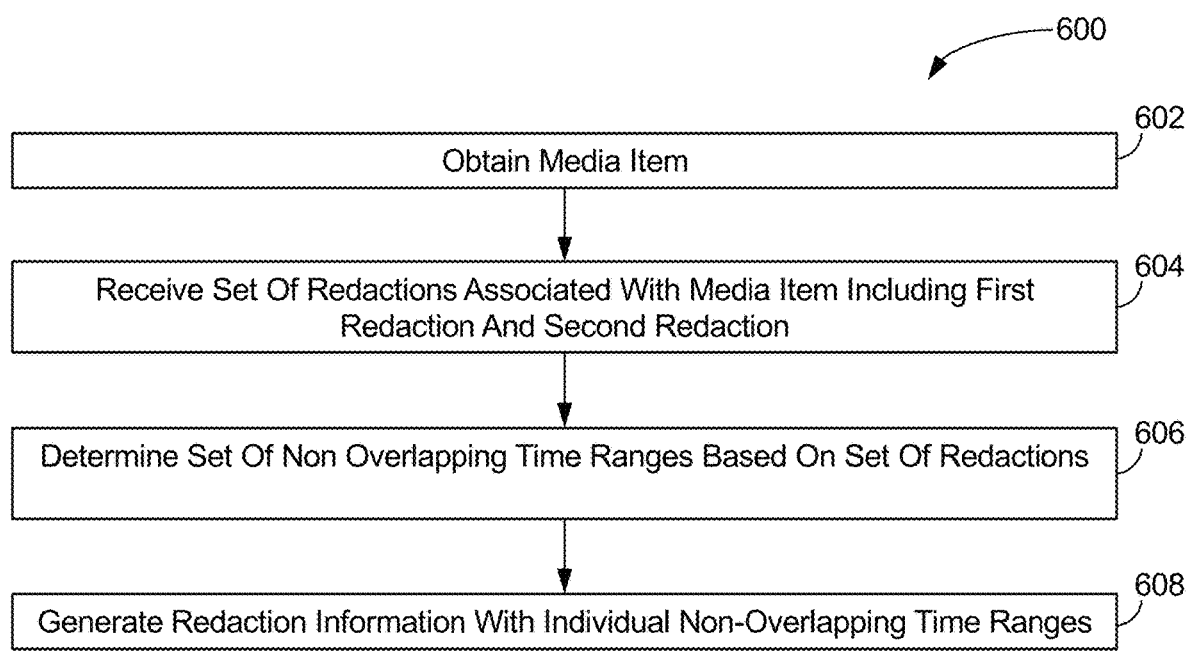
FIG. 4A is a flow chart of an example process for providing overlapping time range redactions in media items, in accordance with one or more implementations.

FIG. 4A is a flow chart of an example method 600 for providing overlapping time range redactions in media items, in accordance with one or more implementations. In some implementations, one or more process steps of FIG. 4A are performed by a device including one or more of computing platform(s) 402, remote platform(s) 404, and/or other devices. In some implementations, one or more process steps of FIG. 4A are performed by another device or a group of devices separate from or including the device.

As shown at step 602, method 600 includes obtaining or receiving a media item. The media item includes one or both of video or audio (or text). For example, the device performs obtaining or receiving a media item. The media item includes one or both of video or audio, as described above.

As shown at step 604, method 600 includes receiving a set of redactions associated with the media item including a first redaction and a second redaction. The first redaction corresponds to a first time range within the media item and the second redaction corresponds to a second time range within the media item. The first time range overlaps with the second time range. For example, the device performs receiving a set of redactions associated with the media item including a first redaction and a second redaction. The first redaction corresponds to a first time range within the media item and the second redaction corresponds to a second time range within the media item. The first time range overlaps with the second time range, as described above.

As shown at step 606, method 600 includes determining a set of non-overlapping time ranges based on the set of redactions. For example, the device performs determining a set of non-overlapping time ranges based on the set of redactions, as described above.

As shown at step 608, method 600 includes generating redaction information with individual non-overlapping time ranges. The redaction information relates to one or more redactions in the set of redactions. For example, the device performs generating redaction information with individual non-overlapping time ranges. The redaction information relates to one or more redactions in the set of redactions, as described above.

Figure 4B:
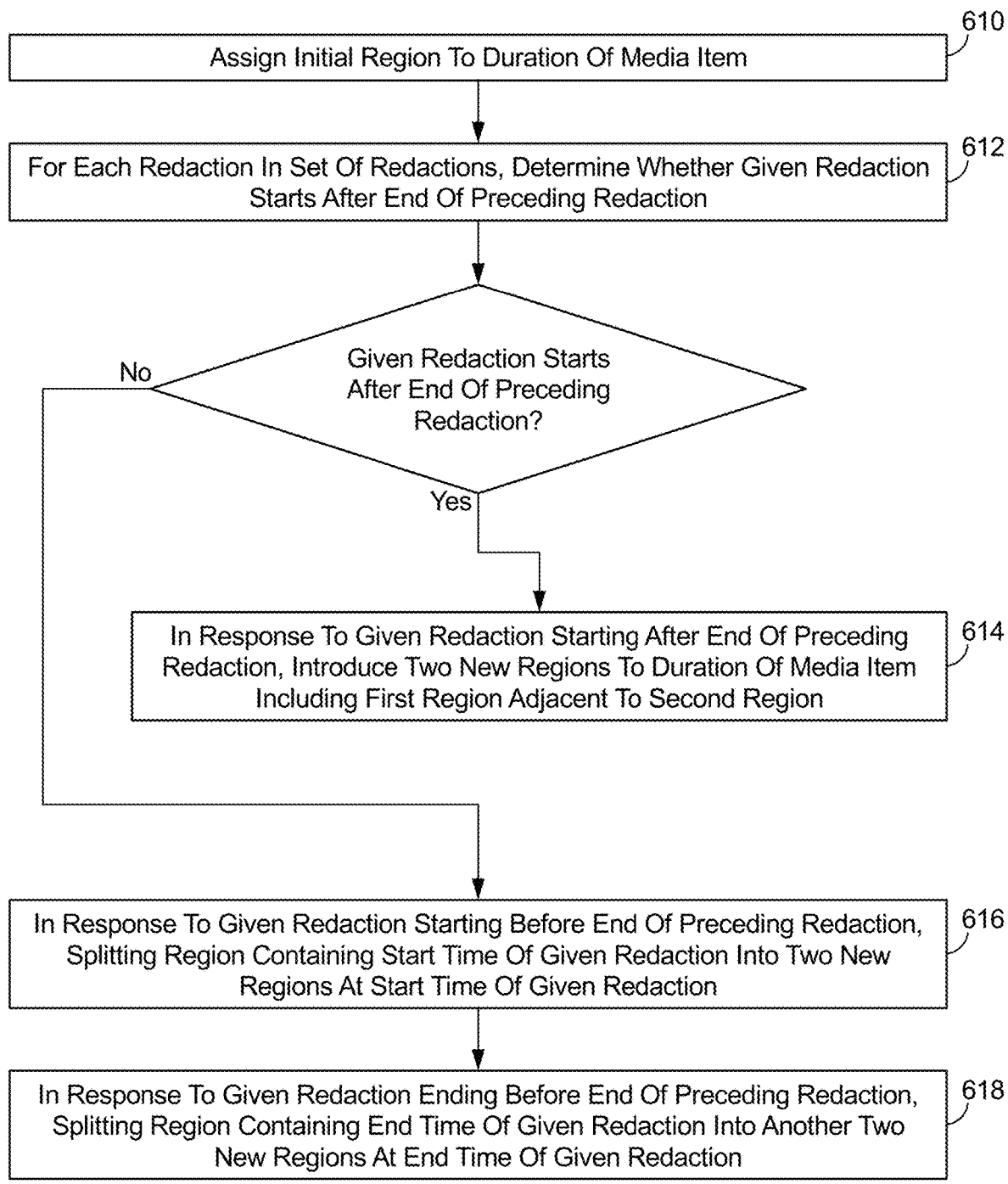
FIG. 4B shows additional steps corresponding to the steps shown in FIG. 4A, in which split regions are used to accommodate overlapping time range redactions, in accordance with one or more implementations.

FIG. 4B shows additional steps corresponding to the steps shown in FIG. 4A, in which split regions are used to accommodate overlapping time range redactions, in accordance with one or more implementations. As shown at step 610, method 600 includes assigning an initial region to a duration of media item. The initial region is unassociated with any redactions. For example, the device performs assigning an initial region to a duration of media item. The initial region is unassociated with any redactions, as described above.

As shown at step 612, method 600 includes for each redaction in the set of redactions, determining whether a given redaction starts after an end of a preceding redaction. For example, the device performs for each redaction in the set of redactions, determining whether a given redaction starts after an end of a preceding redaction, as described above.

As shown at step 614, method 600 includes in response to the given redaction starting after the end of the preceding redaction, introducing two new regions to the duration of the media item including a first region adjacent to a second region. The first region represents the given redaction. The second region represents a remaining duration of the media item. The second region is unassociated with any redactions. For example, the device performs in response to the given redaction starting after the end of the preceding redaction, introducing two new regions to the duration of the media item including a first region adjacent to a second region. The first region represents the given redaction. The second region represents a remaining duration of the media item. The second region is unassociated with any redactions, as described above.

As shown at step 616, method 600 includes in response to the given redaction starting before the end of a preceding redaction, splitting a region containing a start time of the given redaction into two new regions at the start time of the given redaction. For example, the device performs in response to the given redaction starting before the end of the preceding redaction, splitting a region containing a start time of the given redaction into two new regions at the start time of the given redaction, as described above. In one implementation, this is performed in response to the given redaction starting before the end of all preceding redactions, whereas the given redaction may overlap with a redaction besides the one that immediately preceded it.

As shown at step 618, method 600 includes in response to the given redaction ending before the end of a preceding redaction, splitting a region containing an end time of the given redaction into another two new regions at the end time of the given redaction. The given redaction is associated with each region between the start time and end time of the given redaction. For example, the device performs in response to the given redaction starting before the end of the preceding redaction, splitting a region containing an end time of the given redaction into another two new regions at the end time of the given redaction. The given redaction is associated with each region between the start time and end time of the given redaction, as described above. In one implementation, this is performed in response to the given redaction ending before the end of the preceding redaction.

Figure 4C:
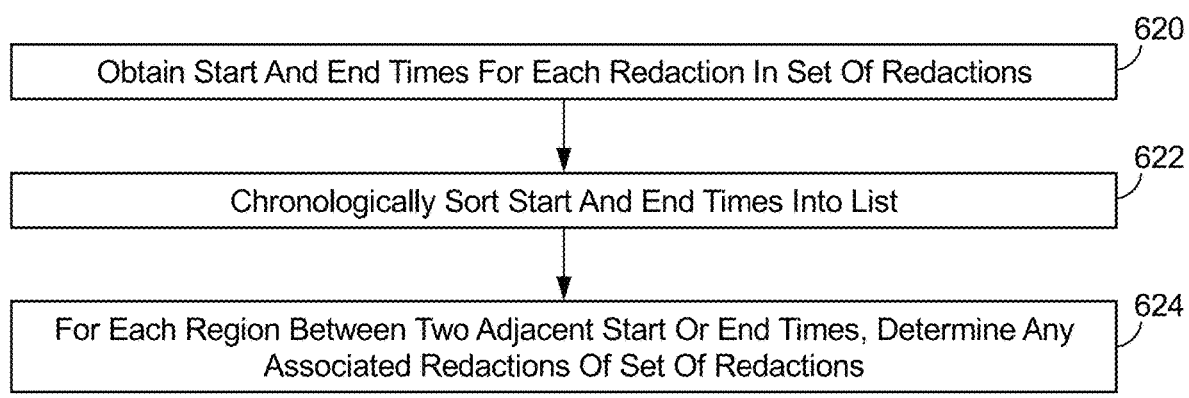
FIG. 4C shows additional steps corresponding the steps shown in FIG. 4A, in which time search is used to accommodate overlapping time range redactions, in accordance with one or more implementations.

FIG. 4C shows additional steps corresponding to the steps shown in FIG. 4A, in which time search is used to accommodate overlapping time range redactions, in accordance with one or more implementations. As shown at step 620, method 600 includes obtaining start and end times for each redaction in the set of redactions. For example, the device performs obtaining start and end times for each redaction in the set of redactions, as described above.

As shown at step 622, method 600 includes chronologically sorting the start and end times into a list. For example, the device performs chronologically sorting the start and end times into a list, as described above.

As shown at step 624, method 600 includes for each region between two adjacent start or end times, determining any associated redactions of the set of redactions. For example, the device performs for each region between two adjacent start or end times, determining any associated redactions of the set of redactions, as described above.

Method 600 includes additional implementations, such as any single implementation or any combination of implementations described herein and/or in connection with one or more other processes described elsewhere herein.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, software or a combination of hardware and software.

It will be apparent that systems and/or methods described herein may be implemented in different forms of hardware, software, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware could be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

What is claimed is:

1. A method in a data processing system for providing overlapping time range redactions in media items, the method comprising:
   receiving, by a processor, a media item comprising video or audio;
   receiving, by the processor, a set of redactions associated with the media item including a first redaction and a second redaction, wherein the first redaction corresponds to a first time range within the media item and the second redaction corresponds to a second time range within the media item, and wherein the first time range overlaps with the second time range;
   assigning, by the processor, an initial region to a duration of media item, the initial region being unassociated with any redactions; and
   for each redaction in the set of redactions, determining, by the processor, whether a given redaction starts after an end of a preceding redaction;
   in response to the given redaction starting after the end of the preceding redaction:
      introducing, by the processor, two new regions to the duration of the media item including a first region adjacent to a second region, wherein the first region represents the given redaction, wherein the second region represents a remaining duration of the media item, and wherein the second region is unassociated with any redactions; and
   in response to the given redaction starting before the end of the preceding redaction:
      splitting, by the processor, a region containing a start time of the given redaction into two new regions at the start time of the given redaction; and
   in response to the given redaction ending before the end of the preceding redaction:
      splitting, by the processor, a region containing an end time of the given redaction into another two new regions at the end time of the given redaction, wherein the given redaction is associated with each region between the start time and the end time of the given redaction;
   determining, by the processor, a set of non-overlapping time ranges based on the set of redactions; and
   associating, by the processor, redaction information with individual non-overlapping time ranges, wherein the redaction information relates to two or more redactions in the set of redactions.

2. The method of claim 1, wherein the preceding redaction immediately precedes the given redaction.

3. The method of claim 1, wherein a start time of the preceding redaction immediately precedes a start time of the given redaction with any interstitial start times being absent.

4. The method of claim 1, wherein the remaining duration of the media item spans from an end time of the given redaction to an end of the media item.

5. The method of claim 1, wherein the redaction information for a given non-overlapping time range is associated with one or more of a redaction identifier, a start time, an end time, confidentiality, a privilege, a sensitivity, or an access level.

6. The method of claim 1, further comprising displaying the redaction information associated with individual non-overlapping time ranges.

7. The method of claim 1, further comprising:
   receiving, by the processor, start and end times for each redaction in the set of redactions;
   chronologically sorting, by the processor, the start and end times into a list; and
   for each region between two adjacent start or end times, determining any associated redactions of the set of redactions.

8. The method of claim 7, wherein chronologically sorting the start and end times includes ordering the start and end times from earliest when playing the media item to latest when playing the media item.

9. The method of claim 7, wherein a given start or end time that coincides with another start time or end time is omitted from the list.

10. The method of claim 1, wherein the given redaction of the set of redactions includes a span of the media item that is to be visually obscured and/or muted before being presented to a particular party.

11. The method of claim 1, wherein the first redaction is associated with a first purpose for redacting and the second redaction is associated with a second purpose for redacting.

12. The method of claim 1, wherein the given redaction of the set of redactions is associated with one or more of audio only, video only, or audio and video of a given media item.

13. The method of claim 1, wherein the set of non-overlapping time ranges account for all redactions across the duration of the media item.

14. A computing platform configured for providing overlapping time range redactions in media items, the computing platform comprising:
   one or more processors; and
   memory storing instructions that, when executed by the one or more processors, cause the computing platform to:
      receive a media item comprising video or audio;
      receive a set of redactions associated with the media item including a first redaction and a second redaction, wherein the first redaction corresponds to a first time range within the media item and the second redaction corresponds to a second time range within the media item, and wherein the first time range overlaps with the second time range;
      assign an initial region to a duration of media item, the initial region being unassociated with any redactions; and
      for each redaction in the set of redactions, determine whether a given redaction starts after an end of a preceding redaction;
      in response to the given redaction starting after the end of the preceding redaction:
         introduce two new regions to the duration of the media item including a first region adjacent to a second region, wherein the first region represents the given redaction, wherein the second region represents a remaining duration of the media item, and wherein the second region is unassociated with any redactions; and
      in response to the given redaction starting before the end of the preceding redaction:
         split a region containing a start time of the given redaction into two new regions at the start time of the given redaction; and
      in response to the given redaction ending before the end of the preceding redaction:
         split a region containing an end time of the given redaction into another two new regions at the end time of the given redaction, wherein the given redaction is associated with each region between the start time and the end time of the given redaction;
determine a set of non-overlapping time ranges based on the set of redactions; and
associate redaction information with individual non-overlapping time ranges, wherein the redaction information relates to two or more redactions in the set of redactions.

15. The computing platform of claim 14, wherein the preceding redaction immediately precedes the given redaction.

16. The computing platform of claim 14, wherein a start time of the preceding redaction immediately precedes a start time of the given redaction with any interstitial start times being absent.

17. The computing platform of claim 14, wherein the remaining duration of the media item spans from an end time of the given redaction to an end of the media item.

18. The computing platform of claim 14, wherein the redaction information for a given non-overlapping time range is associated with one or more of a redaction identifier, a start time, an end time, confidentiality, a privilege, a sensitivity, or an access level.

19. The computing platform of claim 14, wherein the instructions, when executed by the one or more processors, cause the computing platform to:
receive start and end times for each redaction in the set of redactions;
chronologically sort the start and end times into a list; and
for each region between two adjacent start or end times, determine any associated redactions of the set of redactions.

20. A non-transitory machine-readable medium storing instructions that, when executed by one or more processors, cause the one or more processors to perform steps comprising:
receiving a media item comprising video or audio;
receiving a set of redactions associated with the media item including a first redaction and a second redaction, wherein the first redaction corresponds to a first time range within the media item and the second redaction corresponds to a second time range within the media item, and wherein the first time range overlaps with the second time range;
assigning an initial region to a duration of media item, the initial region being unassociated with any redactions; and
for each redaction in the set of redactions, determining whether a given redaction starts after an end of a preceding redaction;
in response to the given redaction starting after the end of the preceding redaction:
introducing two new regions to the duration of the media item including a first region adjacent to a second region, wherein the first region represents the given redaction, wherein the second region represents a remaining duration of the media item, and wherein the second region is unassociated with any redactions; and
in response to the given redaction starting before the end of the preceding redaction:
splitting a region containing a start time of the given redaction into two new regions at the start time of the given redaction; and
in response to the given redaction ending before the end of the preceding redaction:
splitting a region containing an end time of the given redaction into another two new regions at the end time of the given redaction, wherein the given redaction is associated with each region between the start time and the end time of the given redaction;
determining a set of non-overlapping time ranges based on the set of redactions; and
associating redaction information with individual non-overlapping time ranges, wherein the redaction information relates to two or more redactions in the set of redactions.

\* \* \* \* \*